United States Patent
Li et al.

(10) Patent No.: US 12,081,788 B2
(45) Date of Patent: *Sep. 3, 2024

(54) ADAPTIVE MOTION VECTOR RESOLUTION SIGNALING

(71) Applicant: TENCENT AMERICA LLC, Palo Alto, CA (US)

(72) Inventors: Guichun Li, Palo Alto, CA (US); Xiang Li, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/526,054

(22) Filed: Nov. 15, 2021

(65) Prior Publication Data
US 2022/0150530 A1 May 12, 2022

Related U.S. Application Data

(63) Continuation of application No. 16/999,517, filed on Aug. 21, 2020, now Pat. No. 11,218,718.
(Continued)

(51) Int. Cl.
*H04N 19/513* (2014.01)
*H04N 19/159* (2014.01)
(Continued)

(52) U.S. Cl.
CPC ......... *H04N 19/513* (2014.11); *H04N 19/159* (2014.11); *H04N 19/70* (2014.11); *H04N 19/98* (2014.11)

(58) Field of Classification Search
CPC .... H04N 19/102; H04N 19/13; H04N 19/157; H04N 19/159; H04N 19/513; H04N 19/52; H04N 19/523; H04N 19/70; H04N 19/98

See application file for complete search history.

(56) References Cited

U.S. PATENT DOCUMENTS

2015/0195562 A1 7/2015 Li et al.
2016/0360210 A1* 12/2016 Xiu ...................... H04N 19/184
(Continued)

OTHER PUBLICATIONS

Jianle Chen et al., Algorithm description for Versatile Video Coding and Test Model 5 (VTM5), Joint Video Experts Team (JVET) of ITU-T SG 16 WP 3 and ISO/IEC JTC 1/SC 29/WG 11.
(Continued)

*Primary Examiner* — Peter D Le
(74) *Attorney, Agent, or Firm* — Sughrue Mion, PLLC

(57) ABSTRACT

A method, computer program, and computer system for video coding is provided. Video data including at least two frames is received. A motion vector difference is calculated between two frames from among the at least two frames. An adaptive motion vector resolution usage flag is checked. The adaptive motion vector resolution flag may correspond to a precision value and an adaptive motion vector resolution usage value corresponding to whether adaptive motion vector resolution is enabled or disabled. The video data is encoded based on the adaptive motion vector resolution usage value, whereby the motion vector difference is encoded based on the precision value.

20 Claims, 8 Drawing Sheets

Related U.S. Application Data

(60) Provisional application No. 62/891,835, filed on Aug. 26, 2019.

(51) Int. Cl.
  *H04N 19/70* (2014.01)
  *H04N 19/98* (2014.01)

(56) References Cited

U.S. PATENT DOCUMENTS

| | | |
|---|---|---|
| 2019/0208223 A1 | 7/2019 | Galpin et al. |
| 2019/0246143 A1 | 8/2019 | Zhang et al. |
| 2019/0349588 A1 | 11/2019 | Chen et al. |
| 2020/0213591 A1* | 7/2020 | Sun ................ H04N 19/46 |
| 2020/0322599 A1 | 10/2020 | Chuang et al. |
| 2020/0389651 A1 | 12/2020 | Reuze et al. |
| 2021/0385462 A1* | 12/2021 | Deng ............... H04N 19/52 |

OTHER PUBLICATIONS

Benjamin Bross et al., "Versatile Video Coding (Draft 6)", Joint Video Experts Team (JVET) of ITU-T SG 16 WP and ISO/IEC JTC 1/SC 29/WG 11.

"High Efficiency Video Coding", ITU-T H. 265 v4, Dec. 2016.

International Search Report and Witten Opinion of the International Searching Authority dated Nov. 24, 2020, in International Application No. PCTUS20/47966.

* cited by examiner

|  |  | imv_flag value | precision | first bin | | second bin | | third bin | |
| --- | --- | --- | --- | --- | --- | --- | --- | --- | --- |
|  |  |  |  | bin | ctxIdx | bin | ctxIdx | bin | ctxIdx |
| AMVR off | Translational | 0 | ¼ | 0 | [0] | - | - | - | - |
|  | IBC | 1 | 1 | 0 | [0] | - | - | - | - |
|  | Affine | 0 | ¼ | 0 | [0] | - | - | - | - |
| AMVR on | Translational | 3 | ½ | 1 | [0] | 0 | [3] | - | - |
|  | Translational | 1 | 1 | 1 | [0] | 1 | [3] | 0 | [1] |
|  | Translational | 2 | 4 | 1 | [0] | 1 | [3] | 1 | [1] |
|  | IBC | 2 | 4 | 1 | [0] | - | - | - | - |
|  | Affine | 1 | 1/16 | 1 | [0] | 0 | - | 0 | [2] |
|  | Affine | 2 | 1 | 1 | [0] | 1 | - | 1 | [2] |

|  |  | imv_flag value | precision | first bin | | | second bin | | | third bin | |
| --- | --- | --- | --- | --- | --- | --- | --- | --- | --- | --- | --- |
|  |  |  |  | bin | ctxIdx | | bin | ctxIdx | | bin | ctxIdx |
| AMVR off | Translational | 0 | 1/4 | 0 | [0] | | - | - | | - | - |
| | IBC | 1 | 1 | 0 | [0] | | - | - | | - | - |
| | Affine | 0 | 1/4 | 0 | [0] | | - | - | | - | - |
| AMVR on | Translational | 3 | 1/2 | 1 | [0] | | 0 | [4] | | - | - |
| | Translational | 1 | 1 | 1 | [0] | | 1 | [4] | | 0 | [1] |
| | Translational | 2 | 4 | 1 | [0] | | 1 | [4] | | 1 | [1] |
| | IBC | 2 | 4 | 1 | [2] | | - | - | | - | - |
| | Affine | 1 | 1/16 | 1 | [2] | | - | - | | 0 | [3] |
| | Affine | 2 | 1 | 1 | [2] | | - | - | | 1 | [3] |

| | | imv_flag value | precision | first bin | | second bin | | third bin | |
|---|---|---|---|---|---|---|---|---|---|
| | | | | bin | ctxIdx | bin | ctxIdx | bin | ctxIdx |
| AMVR off | Translational | 0 | 1/4 | 0 | [0] | - | - | - | - |
| | IBC | 1 | 1 | 0 | [0] | - | - | - | - |
| | Affine | 0 | 1/4 | 0 | [0] | - | - | - | - |
| AMVR on | Translational | 3 | 1/2 | 1 | [0] | 0 | [2] | - | - |
| | Translational | 1 | 1 | 1 | [0] | 1 | [2] | 0 | [1] |
| | Translational | 2 | 4 | 1 | [0] | 1 | [2] | 1 | [1] |
| | IBC | 2 | 4 | 1 | [0] | - | - | - | [1] |
| | Affine | 1 | 1/16 | 1 | [0] | - | - | 0 | [1] |
| | Affine | 2 | 1 | 1 | [0] | - | - | 1 | [1] |

ADAPTIVE MOTION VECTOR RESOLUTION SIGNALING

CROSS-REFERENCE TO RELATED APPLICATION

This application is a continuation of U.S. patent application Ser. No. 16/999,517, filed on Aug. 21, 2020, which claims priority based on U.S. Provisional Application No. 62/891,835, filed on Aug. 26, 2019, which are incorporated by reference herein in their entireties.

FIELD

This disclosure relates generally to field of data processing, and more particularly to data encoding and decoding.

BACKGROUND

ITU-T VCEG (Q6/16) and ISO/IEC MPEG (JTC 1/SC 29/WG 11) published the H.265/iEVC (High Efficiency Video Coding) standard in 2013 (version 1) 2014 (version 2) 2015 (version 3) and 2016 (version 4). Since then, the potential need for standardization of future video coding technology which could significantly outperform HEVC in compression capability has been studied. In October 2017, the Joint Call for Proposals on Video Compression with Capability beyond HEVC (CfP) was issued. By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10$^{th}$ JVET (Joint Video Exploration Team—Joint Video Expert Team) meeting. With careful evaluation, JVET formally launched the standardization of next-generation video coding beyond HEVC, i.e., the so-called Versatile Video Coding (VVC).

SUMMARY

Embodiments relate to a method, system, and computer readable medium for video coding. According to one aspect, a method for video coding is provided. The method may include receiving video data including at least two frames. A motion vector difference is calculated between two frames from among the at least two frames. An adaptive motion vector resolution usage flag is checked. The adaptive motion vector resolution flag may correspond to a precision value and an adaptive motion vector resolution usage value corresponding to whether adaptive motion vector resolution is enabled or disabled. The video data is encoded based on the adaptive motion vector resolution usage value, whereby the motion vector difference is encoded based on the precision value.

According to another aspect, a computer system for video coding is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data including at least two frames. A motion vector difference is calculated between two frames from among the at least two frames. An adaptive motion vector resolution usage flag is checked. The adaptive motion vector resolution flag may correspond to a precision value and an adaptive motion vector resolution usage value corresponding to whether adaptive motion vector resolution is enabled or disabled. The video data is encoded based on the adaptive motion vector resolution usage value, whereby the motion vector difference is encoded based on the precision value.

According to yet another aspect, a computer readable medium for video coding is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data including at least two frames. A motion vector difference is calculated between two frames from among the at least two frames. An adaptive motion vector resolution usage flag is checked. The adaptive motion vector resolution flag may correspond to a precision value and an adaptive motion vector resolution usage value corresponding to whether adaptive motion vector resolution is enabled or disabled. The video data is encoded based on the adaptive motion vector resolution usage value, whereby the motion vector difference is encoded based on the precision value.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIGS. 2A, 2B and 2C depict syntax elements, according to at least one embodiment;

DETAILED DESCRIPTION

Figure 1:
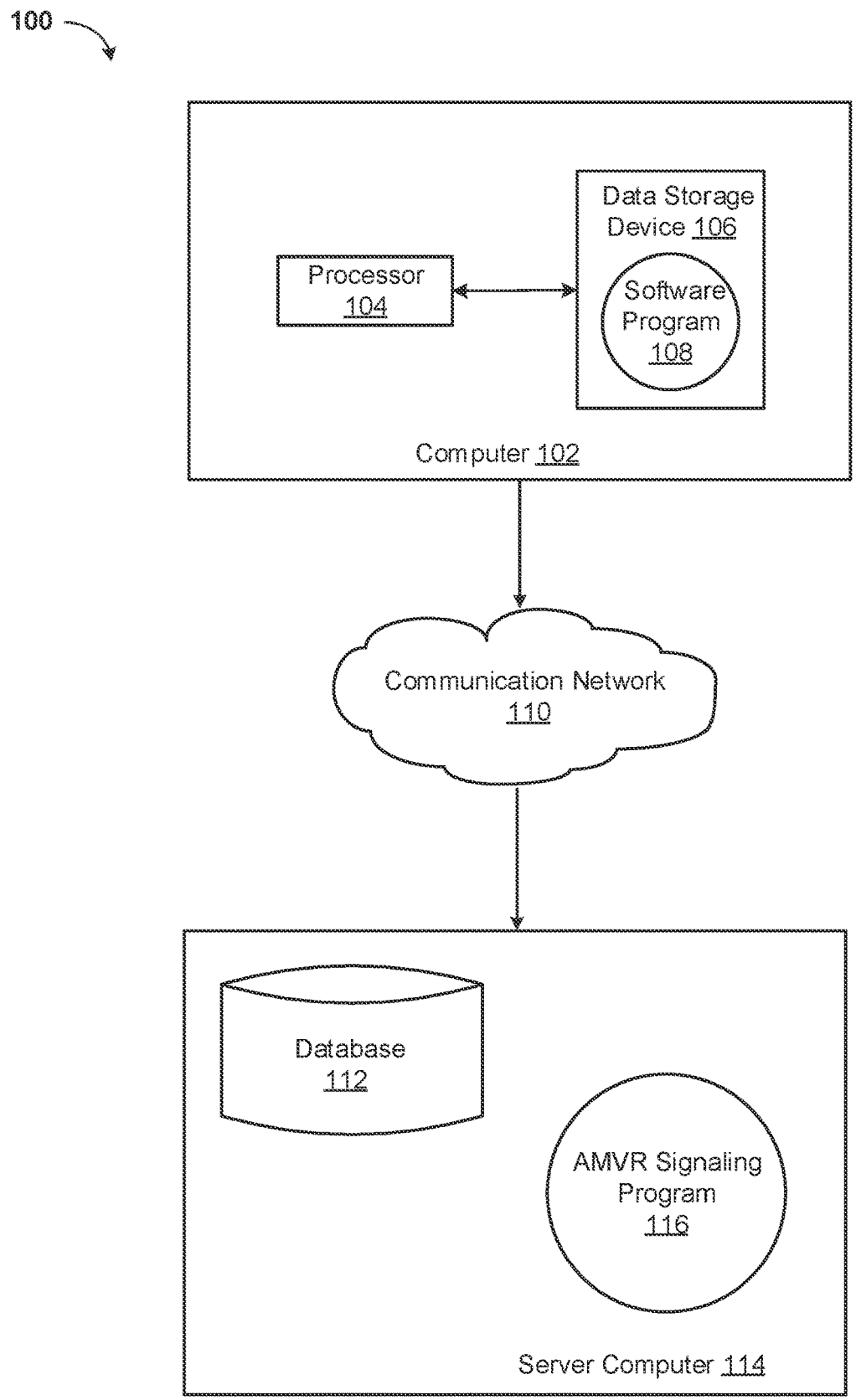
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to data encoding and decoding. The following described exemplary embodiments provide a system, method and computer program for, among other things, use a single value for AMVR usage precision signaling. Therefore, some embodiments have the capacity to improve the field of computing by allowing for reduced complexity in signaling parameters of video coding that may allow for improved encoding and decoding.

As previously described, ITU-T VCEG (Q6/16) and ISO/IEC MPEG (JTC 1/SC 29/WG 11) published the H.265/iEVC (High Efficiency Video Coding) standard in 2013 (version 1) 2014 (version 2) 2015 (version 3) and 2016 (version 4). Since then, the potential need for standardization of future video coding technology which could significantly outperform HEVC in compression capability has been studied. In October 2017, the Joint Call for Proposals on Video Compression with Capability beyond HEVC (CfP) was issued. By Feb. 15, 2018, a total of 22 CfP responses on standard dynamic range (SDR), 12 CfP responses on high dynamic range (HDR), and 12 CP responses on 360 video categories were submitted, respectively. In April 2018, all received CfP responses were evaluated in the 122 MPEG/ $10^{th}$ JVET (Joint Video Exploration Team—Joint Video Expert Team) meeting. With careful evaluation, JVET formally launched the standardization of next-generation video coding beyond HEVC, i.e., the so-called Versatile Video Coding (VVC).

In HEVC, motion vector differences (MVDs) (i.e., between a motion vector and a predicted motion vector of a coding unit may be signalled in units of quarter-luma-sample when use_integer_mv_flag may be equal to 0 in a slice header. In VVC, a coding unit-level adaptive motion vector resolution (AMVR) may allow for an MVD of the coding unit to be coded in different precision. However, AMVR may require multiple flags for determining precision and whether AMVR is enabled or disabled. This may lead to added complexity for signaling. It may be advantageous, therefore, to reduce the number of flags to a single, unified flag to indicate precision and whether adaptive motion vector resolution may be enabled or disabled.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a video coding system 100 (hereinafter "system") for coding video data using a unified AMVR signaling flag. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for coding video data using a unified AMVR signaling flag is enabled to run an Adaptive Motion Vector Resolution (AMVR) Signaling Program 116 (hereinafter "program") that may interact with a database 112. The AMVR Signaling Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger AMVR signaling program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Referring to FIG. 2A, an exemplary unified AMVR usage flag 200A is depicted. According to one or more embodiments, a first bin may be used as adaptive motion vector resolution usage flag for translational inter-prediction mode, Affine inter-prediction mode, and intra-block copy (IBC) mode. A single context may be used for encoding this bin. The total number of context-adaptive binary arithmetic coding (CABAC) contexts used in adaptive motion vector resolution signaling may be four. The variable ctxIdx may be used to denote the index of CABAC context. For translational inter-prediction mode, if adaptive motion vector resolution is signaled to be on, a second bin (with ctxIdx of 3) may be used to signal whether half-pel precision may be used. If half-pel precision is not used, a third bin (with ctxIdx of 1) may be used to signal whether 1-pel precision or 4-pel precision is used. For Affine inter-prediction mode, if adaptive motion vector resolution is signaled to be on, a third bin (with ctxIdx of 2) may be used to signal whether $1/16$-pel precision or 1-pel precision is used. It may be appreciated that the second bin for affine inter-prediction may be skipped. It may further be appreciated that whether the third bin may be called second bin or third bin may depend on implementation. For IBC mode, if adaptive motion vector resolution is signaled to be off, 1-pel precision may be used. If adaptive motion vector resolution is signaled to be on, 4-pel precision may be used. The value of ctxIdx may be used to differentiate the CABAC contexts used in this signaling. The actual values and order of ctxIdx may be different.

Referring to FIG. 2B, an exemplary unified AMVR usage flag 200B is depicted. According to one or more embodiments, a first bin may be used as adaptive motion vector resolution usage flag for translational inter-prediction and IBC mode. A single context may be used for encoding this bin. The adaptive motion vector resolution usage flag for regular inter-prediction mode and IBC mode may share the same context. The adaptive motion vector resolution flag for Affine inter-prediction mode may uses another context for CABAC. The total number of CABAC contexts used for adaptive motion vector resolution signaling may be five.

Figure 3:
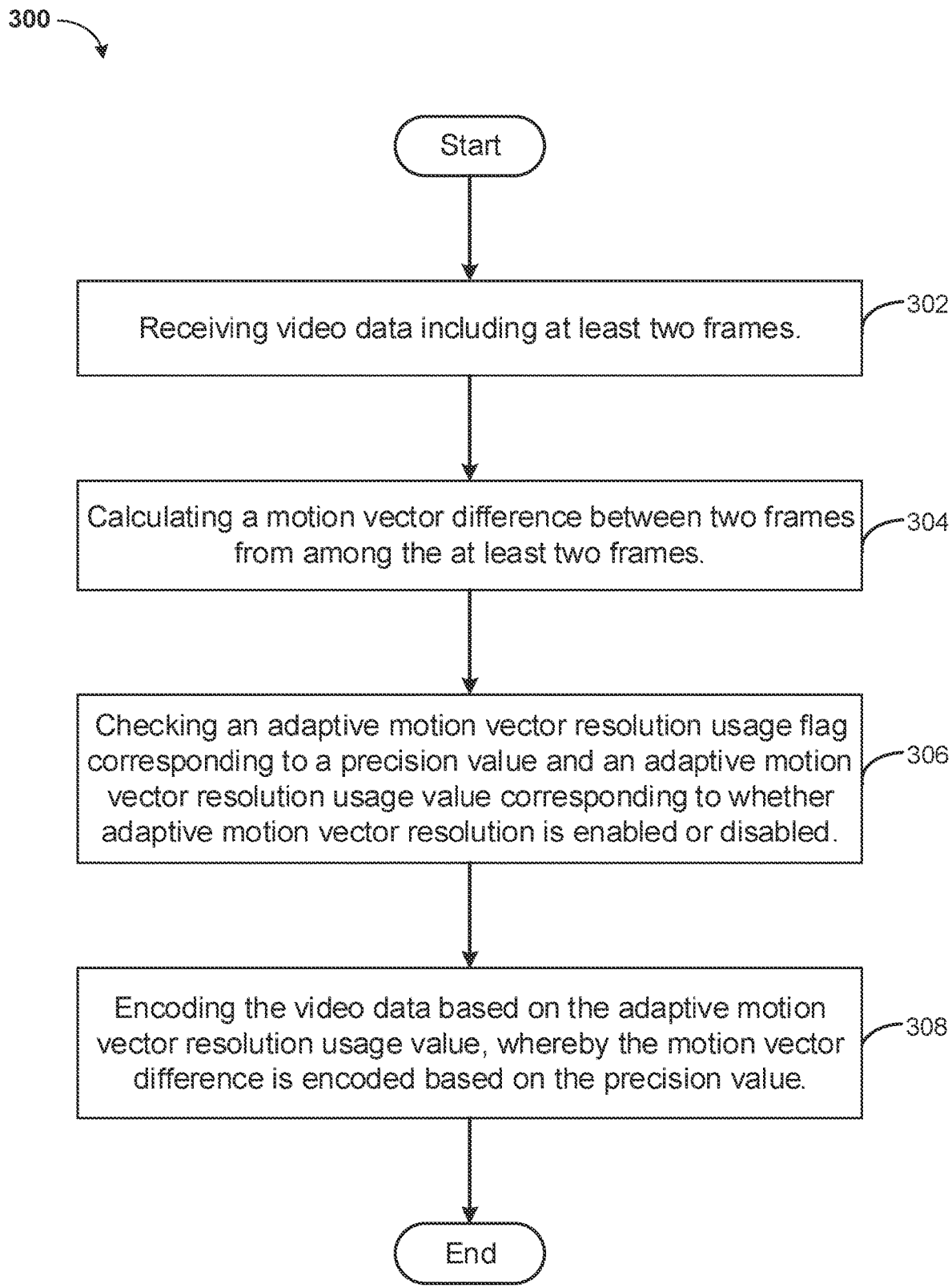
FIG. 3 is an operational flowchart illustrating the steps carried out by a program for video coding, according to at least one embodiment.

Referring to FIG. 2C, an exemplary unified AMVR usage flag 200C is depicted. According to one or more embodiments, a first bin may be used as an AMVR usage flag for translational inter-prediction, Affine inter-prediction, and IBC mode. A single context is used for encoding this bin. For both AMVR for translational inter-prediction mode and Affine mode, the bin used for signaling whether 1-pel precision may be the same. The total number of CABAC context used in AMVR signaling may be three Referring now to FIG. 3, an operational flowchart 300 illustrating the steps carried out by a program for coding video data using a unified AMVR signaling flag is depicted. FIG. 3 may be described with the aid of FIGS. 1, 2A, and 2B. As previously described, the AMVR Signaling Program 116 (FIG. 1) may quickly and effectively encode video based on using a single flag to signal AMVR usage and precision.

At 302, video data including at least two frames is received. The data may correspond to a still image or video data from which the at least two frames may be extracted. In operation, the AMVR Signaling Program 116 (FIG. 1) on the server computer 114 (FIG. 1) may receive video data from the computer 102 (FIG. 1) over the communication network 110 (FIG. 1) or may retrieve the video data from the database 112 (FIG. 1).

At 304, a motion vector difference is calculated between two frames from among the at least two frames. The motion vector difference may be a difference between a motion vector and a predicted motion vector of a coding unit. The motion vector difference may be signalled with a precision, such as units of quarter-luma-samples. In operation, the AMVR Signaling Program 116 (FIG. 1) may calculated a motion vector difference using the received video data.

At 306, an adaptive motion vector resolution usage flag is checked. The adaptive motion vector resolution flag may correspond to a precision value and an adaptive motion vector resolution usage value corresponding to whether adaptive motion vector resolution is enabled or disabled. In operation, the AMVR Signaling Program 116 (FIG. 1) may check for a unified AMVR usage flag 200A (FIG. 2A) to determine whether AMVR is enabled and to what degree of precision the motion vector difference is to be encoded.

At 308, the video data is encoded based on the adaptive motion vector resolution usage value, whereby the motion vector difference is encoded based on the precision value. By encoding the video data based on the motion vector difference, inter-frame prediction may be used that may allow for compression of the video data. In operation, the AMVR Signaling Program 116 (FIG. 1) may encode the video data based on the values in the unified AMVR usage flag 200A (FIG. 2A).

It may be appreciated that FIG. 3 provides only an illustration of one implementation and does not imply any limitations with regard to how different embodiments may be implemented. Many modifications to the depicted environments may be made based on design and implementation requirements.

Figure 4:
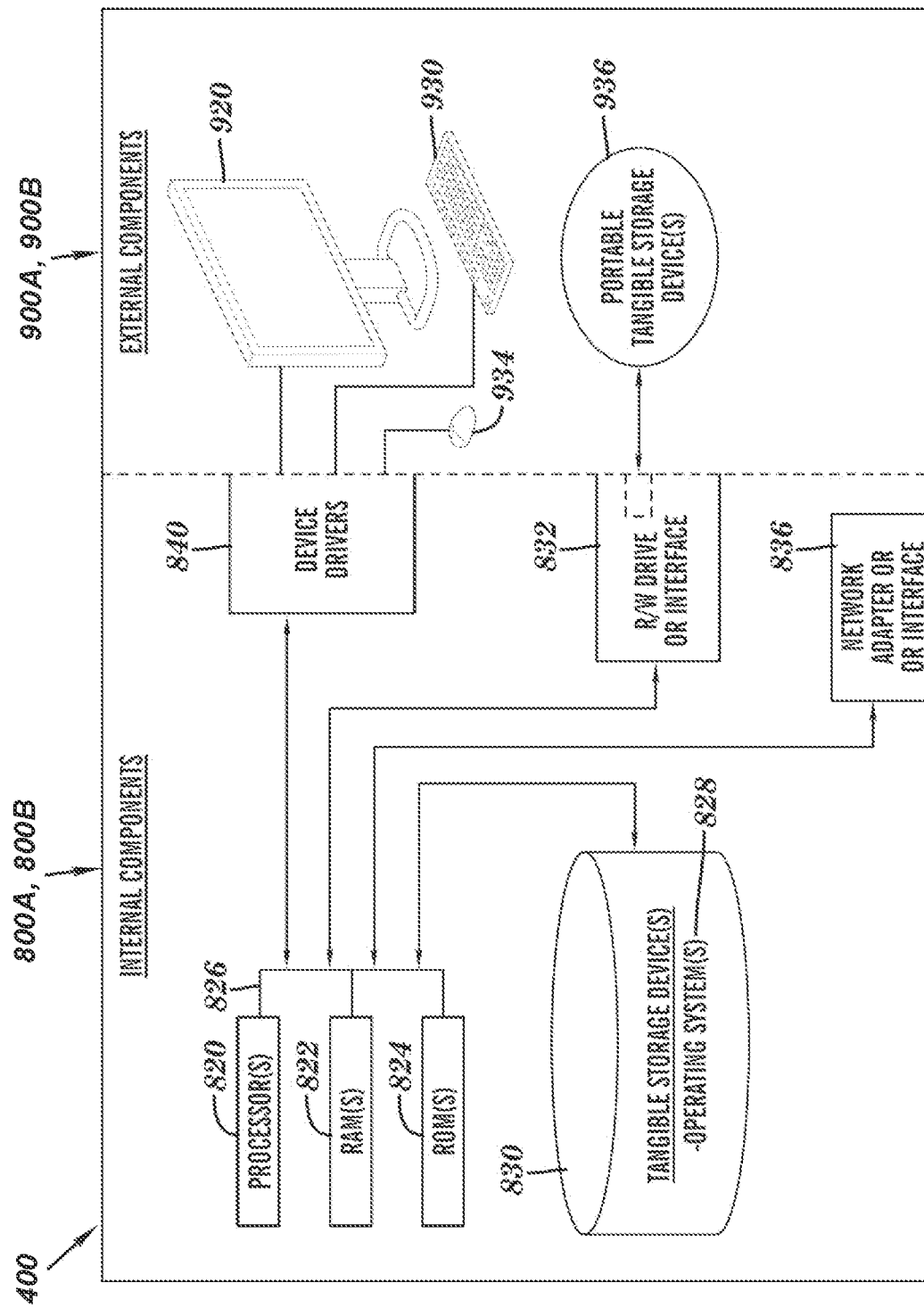
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the AMVR Signaling Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the AMVR Signaling Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the AMVR Signaling Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the AMVR Signaling Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
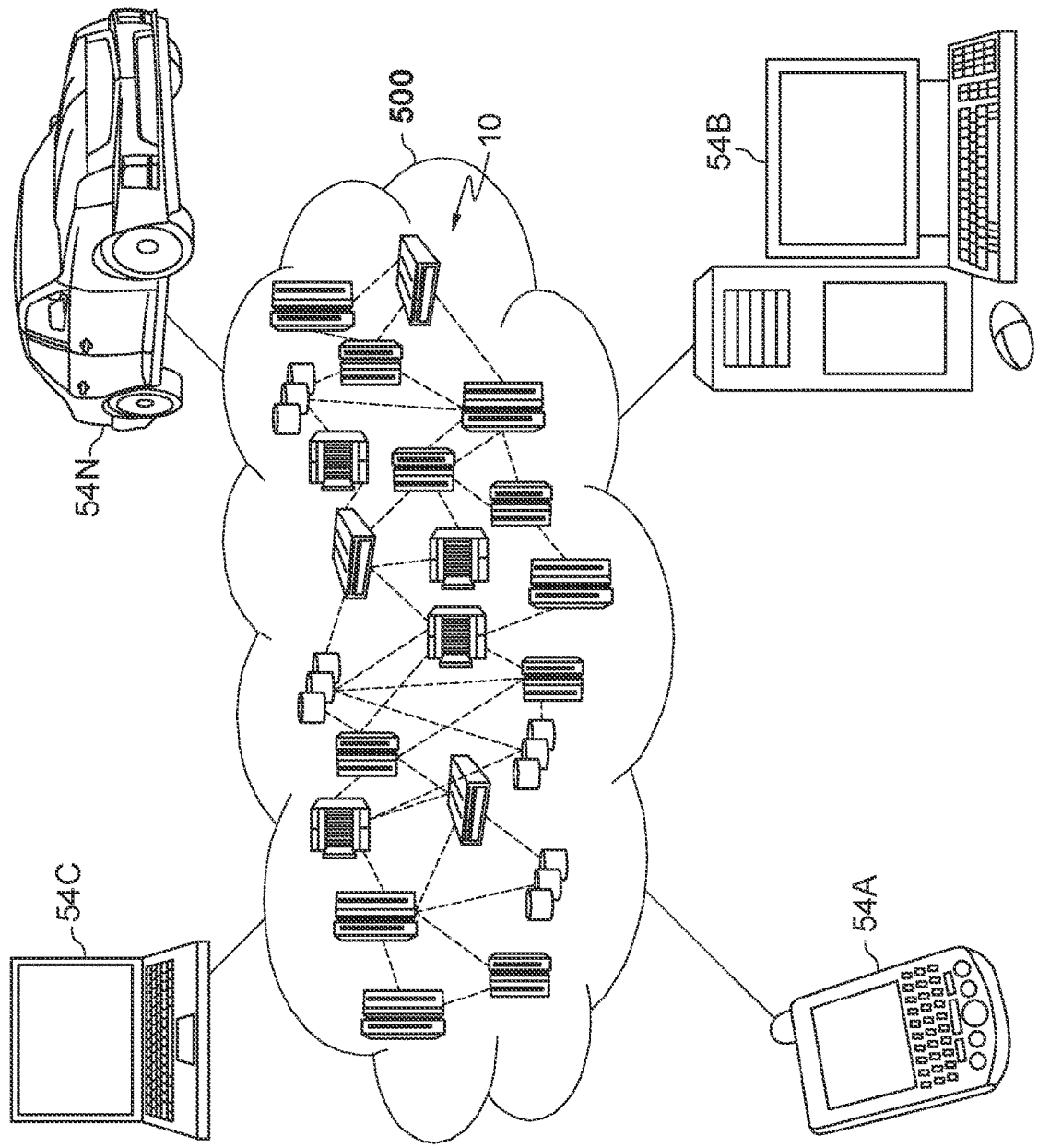
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
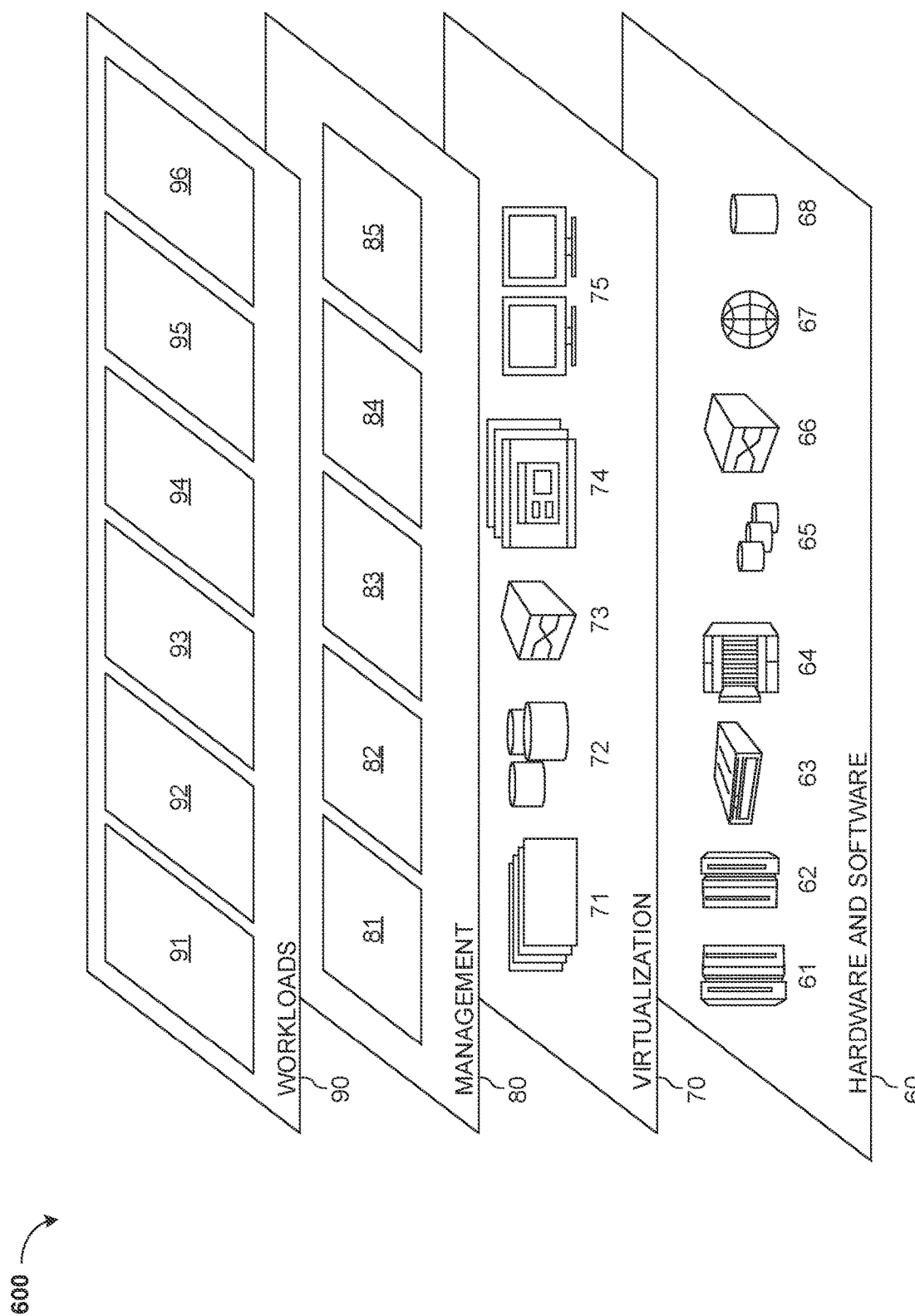
FIG. 6 is a block diagram of functional layers of the illustrative cloud computing environment of FIG. 6, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AMVR Signaling 96. AMVR Signaling 96 may encode and decode video data using a unified AMVR signaling flag.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video coding, executable by a processor, comprising:

receiving coded video data;

checking an adaptive motion vector resolution usage flag comprising (i) a first bin which signals whether adaptive motion vector resolution is enabled, and (ii) a second bin which signals a precision value to be used for a translational inter-prediction mode or an Affine inter-prediction mode, wherein the first bin is encoded in accordance with a first context and the second bin is encoded in accordance with a second context; and decoding the coded video data based on the adaptive motion vector resolution usage flag to obtain at least two frames, wherein a motion vector difference between two frames from among the at least two frames is determined based on the precision value.

2. The method of claim 1, wherein the first bin is decoded by a single context.

3. The method of claim 2, wherein the adaptive motion vector resolution usage flag signals whether at least one from among the translational inter-prediction mode, the Affine inter-prediction mode, and an intra-block copy mode are enabled.

4. The method of claim 3, wherein for the translational inter-prediction mode, the second bin signals whether a half-pel precision is used based on the adaptive motion vector resolution being enabled.

5. The method of claim 4, wherein a third bin signals whether 1-pel precision or 4-pel precision is used if the half-pel precision is not used.

6. The method of claim 3, wherein for the Affine inter-prediction mode, the second bin signals whether $\frac{1}{16}$-pel precision or 1-pel precision is used based on the adaptive motion vector resolution being enabled.

7. The method of claim 3, wherein for the intra-block copy mode, 1-pel precision is used based on the adaptive motion vector resolution being disabled and 4-pel precision is used based on the adaptive motion vector resolution being enabled.

8. The method of claim 3, wherein the second bin signals 1-pel precision is used for both the translational inter-prediction mode and the Affine inter-prediction mode.

9. A computer system for video coding, the computer system comprising:

one or more computer-readable non-transitory storage media configured to store computer program code; and one or more computer processors configured to access said computer program code and operate as instructed by said computer program code, said computer program code including:

receiving code configured to cause the one or more computer processors to receive coded video data;

calculating code configured to cause the one or more computer processors to calculate a motion vector difference between two frames from among at least two frames;

checking code configured to cause the one or more computer processors to check an adaptive motion vector resolution usage flag comprising (i) a first bin which signals whether adaptive motion vector resolution is enabled, and (ii) a second bin which signals a precision value to be used for a translational inter-prediction mode or an Affine inter-prediction mode, wherein the first bin is encoded in accordance with a first context and the second bin is encoded in accordance with a second context; and decoding code configured to cause the one or more computer processors to decode the video data based on the adaptive motion vector resolution usage flag to obtain at least two frames, wherein the motion vector difference between the two frames from among the at least two frames is determined based on the precision value.

10. The computer system of claim 9, wherein the first bin is decoded by a single context.

11. The computer system of claim 10, wherein the adaptive motion vector resolution usage flag signals whether at least one from among the translational inter-prediction mode, the Affine inter-prediction mode, and an intra-block copy mode are enabled.

12. The computer system of claim 11, wherein for the translational inter-prediction mode, the second bin signals whether a half-pel precision is used based on the adaptive motion vector resolution being enabled.

13. The computer system of claim 12, wherein a third bin signals whether 1-pel precision or 4-pel precision is used if the half-pel precision is not used.

14. The computer system of claim 11, wherein for the Affine inter-prediction mode, the second bin signals whether $\frac{1}{16}$-pel precision or 1-pel precision is used based on the adaptive motion vector resolution being enabled.

15. The computer system of claim 11, wherein for the intra-block copy mode, 1-pel precision is used based on the adaptive motion vector resolution being disabled and 4-pel precision is used based on the adaptive motion vector resolution being enabled.

16. The computer system of claim 11, wherein the second bin signals 1-pel precision is used for both the translational inter-prediction mode and the Affine mode.

17. A non-transitory computer readable medium having stored thereon a computer program for video coding, the computer program configured to cause one or more computer processors to:

receive coded video data;

check an adaptive motion vector resolution usage flag comprising (i) a first bin which signals whether adaptive motion vector resolution is enabled, and (ii) a second bin which signals a precision value to be used for a translational inter-prediction mode or an Affine inter-prediction mode, wherein the first bin is encoded in accordance with a first context and the second bin is encoded in accordance with a second context; and decode the video data based on the adaptive motion vector resolution usage flag to obtain at least two frames, wherein a motion vector difference between two frames from among the at least two frames is determined based on the precision value.

18. The non-transitory computer readable medium of claim 17, wherein the first bin is decoded by a single context, and wherein the adaptive motion vector resolution usage flag signals whether at least one from among the translational inter-prediction mode, the Affine inter-prediction mode, and an intra-block copy mode are enabled.

19. The non-transitory computer readable medium of claim 18, wherein for the translational inter-prediction mode, the second bin signals whether a half-pel precision is used based on the adaptive motion vector resolution being enabled.

20. The non-transitory computer readable medium of claim 18, wherein for the Affine inter-prediction mode, the second bin signals whether $\frac{1}{16}$-pel precision or 1-pel precision is used based on the adaptive motion vector resolution being enabled.

\* \* \* \* \*